United States Patent [19]

Dohrmann

[11] Patent Number: 4,988,081
[45] Date of Patent: Jan. 29, 1991

[54] IMPACT DAMPER FOR A MOTOR VEHICLE

[75] Inventor: Wolfgang Dohrmann, Eitorf, Fed. Rep. of Germany

[73] Assignee: Boge AG, Eitorf, Fed. Rep. of Germany

[21] Appl. No.: 466,039

[22] Filed: Jan. 17, 1990

[30] Foreign Application Priority Data

Jan. 19, 1989 [DE] Fed. Rep. of Germany ....... 3901449

[51] Int. Cl.⁵ .......................... F16F 9/16; B60R 19/02
[52] U.S. Cl. .................................... 267/64.15; 188/276;
188/322.22; 188/371; 188/322.19; 267/64.26;
267/64.28; 267/116; 267/139; 293/133;
293/134
[58] Field of Search ............... 267/64.15, 64.11, 64.28,
267/139–140, 116, 64.25, 120–124, 64.26;
188/371, 276, 277, 322.22, 322.15, 322.19,
322.21, 322.5, 376, 318, 322.13, 322.14;
293/133, 134

[56] References Cited

U.S. PATENT DOCUMENTS

| 3,958,672 | 5/1976 | Keilholz | 188/277 |
|---|---|---|---|
| 3,993,294 | 11/1976 | Wössner et al. | 293/134 X |
| 4,108,423 | 8/1978 | Skubal | 267/64.15 |
| 4,337,849 | 7/1982 | Siorek et al. | 188/276 |
| 4,369,864 | 1/1983 | DeCarbon | 188/277 |
| 4,426,109 | 1/1984 | Fike, Jr. | 293/133 |
| 4,641,872 | 2/1987 | Löhr et al. | 293/133 |
| 4,651,979 | 3/1987 | Freitag et al. | 188/276 X |
| 4,718,647 | 1/1988 | Ludwig | 267/64.11 |
| 4,785,921 | 11/1988 | Hosan et al. | 188/276 X |
| 4,842,106 | 6/1989 | Ludwig et al. | 188/276 X |

FOREIGN PATENT DOCUMENTS 7521957 11/1975 Fed. Rep. of Germany .
2744898 8/1979 Fed. Rep. of Germany .
2218952 4/1980 Fed. Rep. of Germany .
3419165 11/1985 Fed. Rep. of Germany .

Primary Examiner—Douglas C. Butler
Attorney, Agent, or Firm—Nils H. Ljungman & Associates

[57] ABSTRACT

An impact damper or an energy absorbing device having at least two tubes which telescope one into the other and are configured especially for motor vehicles for the dampening of forces on a vehicle which crashes into an obstacle. In the inner space or interior of the impact damper, there may be included at least one dampening fluid which is filled through a filling device; a throttling point; and at least one component which confines the at least one dampening fluid in the inner space.

17 Claims, 2 Drawing Sheets

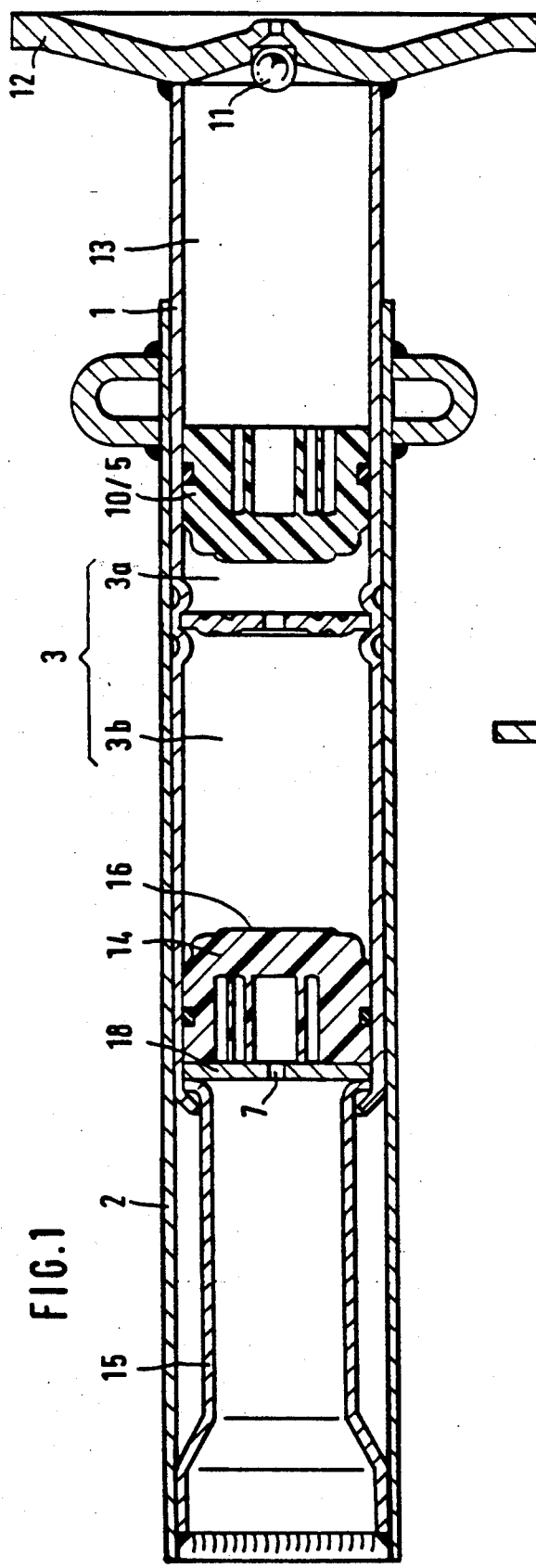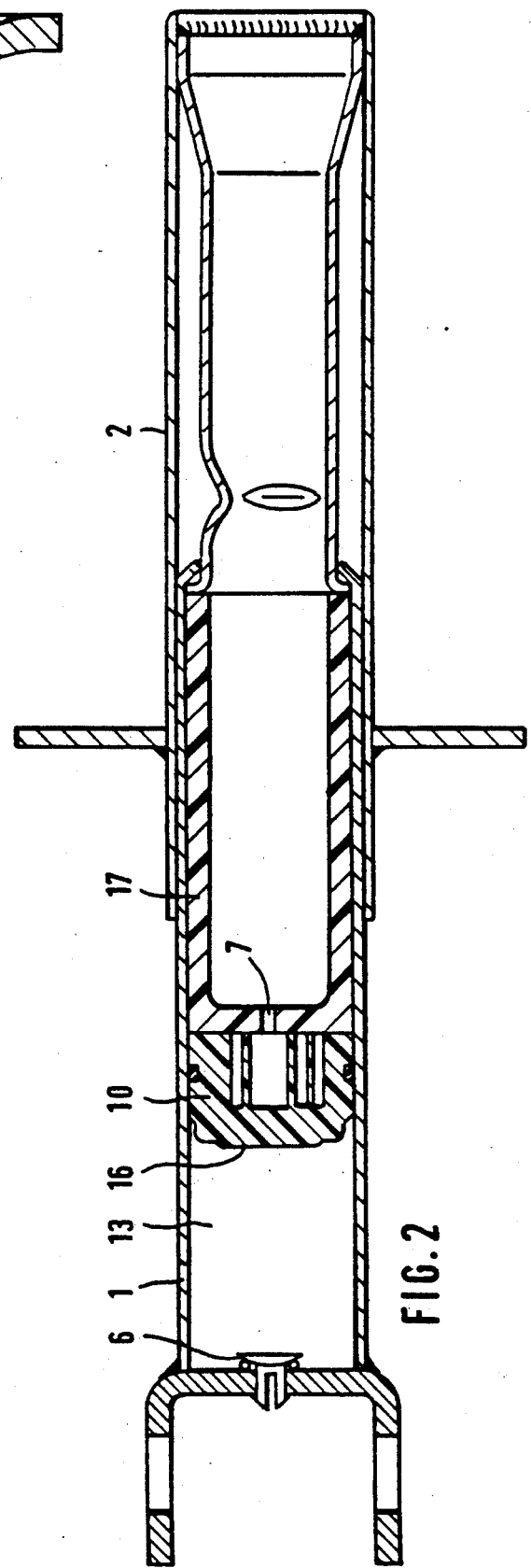

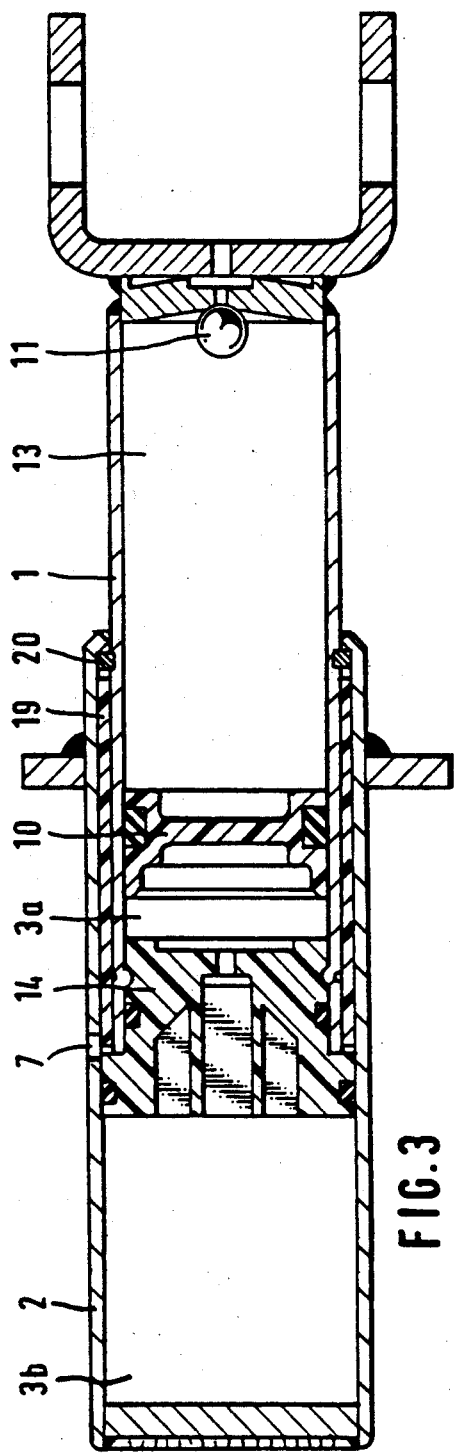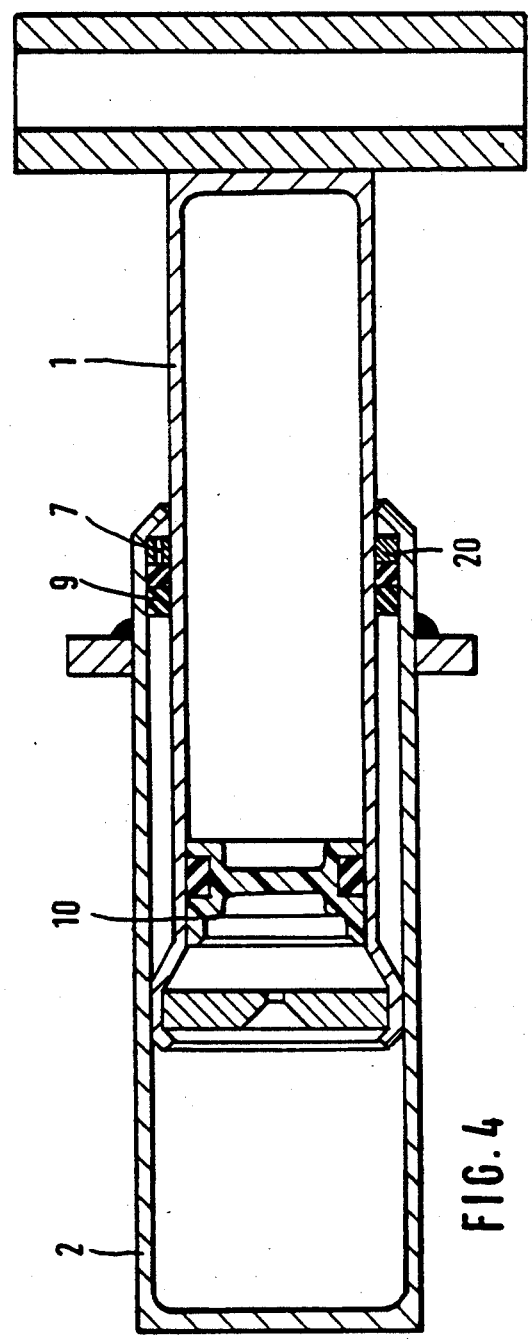

IMPACT DAMPER FOR A MOTOR VEHICLE

BACKGROUND OF THE INVENTION

1. Field of the Invention

This invention relates to an impact damper and, more specifically, to an energy absorbing device having at least two tubes which telescope one into the other and being configured especially for motor vehicles for the dampening of forces on a vehicle which crashes into an obstacle. In the inner space or interior of the impact damper, there may be included at least one dampening fluid which is filled through a filling device; a throttling point; and at least one component which confines the at least one dampening fluid in the inner space.

2. Description of the Prior Art

Energy absorbing devices of this general type have been disclosed, for example: German patent Nos. 22 29 954, and 22 18 952 and German Laid Open patent appln. No. 34 19 165. In such devices of the prior art, two telescoping tubes were employed to include at least one fluid chamber which was filled with a dampening fluid and/or a ga cushion of high pressure design to be contained in a gas chamber. With these types of energy absorbing devices, it has been found that, with an additional heating of the gases and/or the liquid, the energy absorbing devices would explode from heat expansion. The explosion can be caused by the fact that the metallic components and the metallic safety elements may be made of steel, which softens or melts, so that they either no longer provide their safety function or cause the tubes to become useless through bursting or ripping. During the uncontrolled expansion, the bumpers and a portion of the energy absorbing devices to which they are fastened can be thrown together from the vehicle. This type of accident is possible if a particular vehicle or a stock pile of vehicles catches fire. In practice, it has been found that the seals, such as O-rings, which are made from rubber do not burn, but may decompose at 560° C. and turn into ash at 850° C. The steel components would have ceased to properly function at a lower temperature. On the other hand, some plastic components, such as pistons or seals, have been made of particular plastic material which becomes doughy or more pliable at 270° C. and, therefore, seal better than in their original condition, at normal, lower operating temperatures.

It is disadvantageous, therefore, that, in such a dangerous situation, the prior art devices include no opening through which the liquid or the gas could respectively escape. As a result, there can occur a destruction of the metallic components. The energy absorbing device or the components of the energy absorbing device are respectively capable of exploding because of the resulting high internal pressure above 200° C.

Furthermore, safety valves, such as fusible links for the pressure containers, are shown, for example, in German Utility Model No. 75 21 957.7 and German Patent Publication Published for Opposition Purposes No. 27 44 898. With such valves, the pressurized system will experience a fast pressure drop during elevated temperatures. Such devices include separate arrangements for providing flow routes to the pressure container which ar closed off either by means of a soldered in plug or by means of a soldered plug which is installed with a nipple. These devices include the disadvantage of requiring additional components which have no relationship to the actual function or operation of the pressure system. Such additional components are not only costly but, because of the compact structure of such energy absorbing systems for a motor vehicle, are hard to install.

OBJECT OF THE INVENTION

It is an object of the present invention to provide an energy absorbing system for a vehicle which will not explode when subjected to excessive heat which may occur, for instance, during the burning of the vehicle.

SUMMARY OF THE INVENTION

This and other objects of the invention are provided in a preferred embodiment thereof which includes at least one confining component part which is provided as a fusible element to open a flow route between the inner chamber and the atmosphere at a temperature above approximately 200° C. It is advantageous in the preferred embodiment for the fusible element, in its geometrical form, its material composition or its rupture point, to be arranged in such a fashion that, during the heating of the fusible element, a passage to the atmosphere is opened. The resulting reduction in pressure of the inner chamber of the energy absorbing device can occur before the metallic safety element or metallic component parts of the energy absorbing device will respectively exceed the stretch or failure limits of the metal due to softening or melting. For a desired rate of pressure relief in one embodiment, O-rings having a maximum thickness of approximately 3 mm can be utilized to prevent the heated inner pressure of an energy absorbing device from escaping suddenly.

As another significant feature of the preferred embodiment at least one of the confining component parts preferably includes a preferred plastic. A preferred plastic mixture is advantageously selected to include characteristics which may cause the mixture to melt or dissolve during heating to approximately 220° C. In order to be able to cushion or absorb the corresponding inner pressures of an energy absorbing device during normal operating conditions, these plastic components can be reinforced with fiberglass without causing any problems. The plastic would tend to dissolve at approximately 220° C. while the fiberglass would tend to become liquid at approximately 300° to 320° C. These characteristics are quite different from those of the rubber parts which have heretofore been used and include a life expectancy which was assured up to approximately 800° C.

As a further significant feature of the preferred embodiment, a piston and/or separation piston and/or a filling device could be employed as a confining component part.

In one embodiment of the invention, the filling device is employed as the confining component part. The filling device not only serves as a reliable filling means for the operational materials such as the dampening fluid or pressurized gas but also, at the same time, functions as the fusible element which serves for the reduction of pressure in the case of an emergency. The preferred filling device is advantageously a ball or check valve.

According to another embodiment, two tubes which telescope into each other have sealing elements between the individual tubes which also function as fusible elements.

The various objects of the invention are provided in a preferred embodiment thereof including an impact damper for a motor vehicle having an outer tubular member and an inner tubular member. The inner tubular member is disposed within a portion of the outer tubular member. The impact damper has components for attachment to a portion of the body of the motor vehicle and components for attachment to a portion of the motor vehicle being impacted upon during a collision. There is an apparatus for interacting with a relative movement of the inner tubular member for transferring forces produced during impact with at least one of the outer tubular member and the inner tubular member. Fluid is disposed within the impact damper for transferring at least a portion of forces upon the tubular members and for absorbing forces of impact to the fluid during impact for slowing down the motor vehicle during a collision. There are components for confining fluid within the impact damper. At least one of the inner tubular member and the outer tubular member has an interface portion for interfacing with the fluid. There are elements for retaining the inner tubular member in a predetermined position relative to the fluid and the at least one outer tubular member at times when the forces of impact are not present. The elements for retaining are also for retaining a position of the inner tubular member with respect to the outer tubular member with the retaining elements being disposed such that the inner tubular member is movable with respect to the outer tubular member. The confining components include features for opening a flow route for the fluid to flow out of the impact damper, with the features for opening the flow route being activatable at temperatures at least as great as 200° C.

The various objects of the invention are provided in a preferred embodiment thereof further including an impact damper for a motor vehicle having an outer tubular member and an inner tubular member. The inner tubular member is disposed within a portion of the outer tubular member. The impact damper has components for attachment to a portion of the body of the motor vehicle and components for attachment to a portion of the motor vehicle being impacted upon during a collision. There is an apparatus for interacting with a relative movement of the inner tubular member for transferring forces produced during impact with at least one of the outer tubular member and the inner tubular member. Fluid is disposed within the impact damper for transferring at least a portion of forces upon the tubular members and for absorbing forces of impact to the fluid during impact for slowing down the motor vehicle during a collision. There are components for confining fluid within the impact damper. At least one of the inner tubular member and the outer tubular member has an interface portion for interfacing with the fluid. There are elements for retaining the inner tubular member in a predetermined position relative to the fluid and the at least one outer tubular member at times when the forces of impact are not present. The elements for retaining are also for retaining a position of the inner tubular member with respect to the outer tubular member with the retaining elements being disposed such that the inner tubular member is movable with respect to the outer tubular member. The confining components include features for opening a flow route for the fluid to flow out of the impact damper, with the features for opening the flow route being activatable at temperatures at least as great as about 175° C.

BRIEF DESCRIPTION OF THE DRAWINGS

The preferred embodiments including various features of the invention are schematically shown in the drawings.

FIG. 1 is a sectional, elevational view of a preferred energy absorbing device capable of being used with a vehicle bumper system.

FIG. 2 is a sectional, elevational view of another preferred energy absorbing device.

FIG. 3 is a sectional, elevational view of yet another preferred energy absorbing device.

FIG. 4 is a sectional, elevational view of still another preferred energy absorbing device.

DESCRIPTION OF THE PREFERRED EMBODIMENTS

An energy absorbing device 21, shown in FIG. 1, includes an outer tube 2 and an inner tube 1 which is enclosed at a bottom 12 thereof. Beginning from the bottom 12, in succession, the device 21 includes a gas chamber 13 which can contain a gas cushion of high pressure; a separating piston 10, which is guided, in a tight but movable manner, by means of a sealing ring 5 inside the inner tube 1 and a first fluid or liquid chamber 3a. The chamber 3a of the inner tube 1 is particularly defined by a partition which contains a throttle opening. The portion is sequentially followed by a second fluid or liquid chamber 3b and a working piston 14 which is located in a movable manner within the inner tube 1 and is sealed against the inner surface of the inner tube 1. Although disposed within the inner tube 1, the working piston 14 is attached solidly and inseparately to the outer tube 2 by means of bottom 8 and an intermediate tube 15. The bottom 12 serves as a bumper connecting means B, to connect the device 21 to the bumper of the vehicle while the outer tube 2 includes frame connecting means A, for connecting the device 21 to the vehicle itself. The outer tube 2 includes an inner chamber which is located within the intermediate tube 15 and is connected to the atmosphere.

In the preferred embodiment, the working piston 14 is made from plastic and is provided a hollow geometric structure. In the area of working surface 16 of the piston 14, the wall is sufficiently thick to remain stable under normal operating conditions. However, because of the preferred plastic material from which it is made, above the temperature of about 200° C., the wall of the piston 14 will melt. Such plastic material may include, for example, some types of heat resistant cast epoxies, FEP fluorocarbons, glass-filled melamines, glass-filled nylon, molded phenolics, CFE fluorocarbons, and/or high strength alkyds.

More specifically, as shown in the Table hereinbelow, materials which can be selectively used for the various fusible elements or links can be, for example, thermoplastic man-made fibers or synthetics.

| Material 6 | Short Designation | Melting Point-Temperature |
| --- | --- | --- |
| Polyamides | PA 6 | about 220° C. |
|  | PA 66 | about 220° C. to 265° C. |
|  | PA 610 | about 215° C. |
|  | PA 12 | about 172° C. to 180° C. |
| Polyoxymethylene | POM | about 175° C. |
| Polytetrafluororethylene | PTFE | about about 175° C. |
| Polyethylene | HDPE | about 130° C. |

| -continued | | |
|---|---|---|
| Material 6 | Short Designation | Melting Point-Temperature |
| Linear Polyester | PETP | about 255° C. |

When the wall of piston 14 melts, it is possible to provide a desired reduction of pressure within the chambers 3a and 3b, during an extremely high inner pressure, through the hollow inner space of working piston 14 and a bore 7 of bottom 8. The fluid will vent to the atmosphere through the bore 7 to cause the desired pressure reduction. Additionally, in the preferred device 21, the closing or check ball 11 of a check valve, in the bottom 12 to provide the function of a filling device, can be produced out of a fusible material, similar to the plastic material of the piston 14. As a result, the gas chamber 13 can be expected to vent to the atmosphere if a comparable temperature is experienced.

As seen in FIG. 2, another energy absorbing device 22 also includes an inner tube 1 and an outer tube 2 which respectively includes a bumper connecting means B2 and a frame connecting means A2. The energy absorbing device 22 includes a pressurized gas chamber 13, located within the inner tube 1, with the gas chamber 13 being sealed to the atmosphere by means of separating piston 10. the gas chamber 13 is filled with pressurized gas through a check valve having a closing or check ball 6 which is similar in function to the ball 11 of the device 21. In this embodiment of the invention, the separation piston 10 is again constructed from a similar preferred plastic material which is capable of melting at a temperature above about 200° C. Geometrically, the piston 10 is again designed so that, at the working surface 16, the wall thickness will function as a fusible line, which is capable of melting, in an emergency, to expose a bore 7 to atmosphere in the intermediate element 17. It is also possible, in the preferred device 22, to produce the intermediate element 17 from a similar plastic material with a steel washer 18, having a corresponding relief bore therethrough, being located between the separation piston 10 and the intermediate element 17. The inner space of outer tube 2, including the interior of the intermediate element 17, is opened to the atmosphere so that the reduction of pressure can occur through the inner space.

As seen in FIG. 3, yet another energy absorbing device 23 is configured to have a shorter overall length. The device 23 can also be mounted to the vehicle by a bumper connecting means B3 and a frame connecting means A3. The inner tube 1 is guided within the outer tube 2 by means of a slotted plastic tube 19. A retainer ring 20 is also disposed between the inner tube 1 and the outer tube 2 to basically establish the predetermined relative positioning of the tubes 1, 2 during normal operation. A gas chamber 13 is again located within the inner space of the inner tube 1. Filling of the gas chamber 13 is again provided through a check valve having a closing ball 11. For the separation of a fluid chamber 3a and the gas chamber 13, a separation piston 10 is provided. A working piston 14 is located between the fluid chambers 3a and 3b and includes a throttle port therethrough. The working piston 14 is axially disposed in a fixed manner within the inner tube 1 at the end thereof. The working piston 14, and associated tube 1, are guided for axial movement within the outer tube 2. The outer tube 2 has a bore 7 in its outer surface which is only exposed whenever working piston 14 becomes a fusible link, at the corresponding temperature discussed above, and moves into another physical condition and begins to melt. As seen in FIG. 3, the bore 7 is axially located in alignment with the working piston 14 when the piston 14 is in the expanded, normal operating position. In a telescoping condition, with the tube 1 axially relocated within the tube 2, the plastic tube 19 includes at least one slit which is aligned with the bore 7 to provided a flow route to the atmosphere when there is melting of the piston 14 in an emergency.

As seen in FIG. 4, still another energy absorbing device includes two telescoping tubes 1 and 2 which again respectively include a bumper connecting means B4 and a frame connecting means A4. Although not specifically shown in the schematic view of FIG. 4, the device 24 could again be filled by a fusible filling device, similar to those discussed hereinabove. The device 24 could also include a pair of fluid chambers connected by a throttle passage through a working piston and a separation piston 10 to isolate the gas chamber from the fluid or liquid chamber. The tubes 1 and 2 are retained in telescoping engagement by a retainer ring, in the form of a "shrunk on" ring 20. At least one O-ring seal 9 is installed between the tubes 1 and 2. In the preferred embodiment, the seal, including the O-rings 9 as well as at least part of the "shrunk on" ring, which is exposed to the atmosphere, being equipped with a bore 7. With such an alternative embodiment being selectively employed, it should be clear that the "shrunk on" ring 20 can be formed of the preferred plastic material to again function as fusible elements. Several alternative embodiments are possible, for example, including the incorporation of a "shrunk on" ring, may directly function as a fusible element or the O-rings 9 alone can be employed to serve as the fusible element since the bore 7 would allow the fluid to escape from the fluid chamber after the O-rings 9 melt.

In summary, the various embodiments of the preferred energy absorbing device includes two telescoping tubes for a vehicle or automobile and at least one fluid chamber filled with a dampening fluid and/or gas cushion. The fluid and/or gas is normally contained under high pressure in the chamber but may be subjected to a desired pressure reduction above a temperature level of approximately 200° C. by the incorporation of a least one fusible element which is capable of melting at about 200° C. to allow a flow route for the fluid and/or gas to escape to the atmosphere.

Such an energy absorbing device, with at least two tubes which telescope into each other, is especially provided for use on a motor vehicle for the breaking of the dampening forces on the vehicle which crashes into an obstacle. In the inner space or interior of the device, there is at least one dampening substance, which is filled through a filling device and may pass through a throttling port, and at least one component which confines or restricts the at least one dampening fluid in the inner space. The device is characterized by the fact that at least one confining component is provided in the form of a fusible element which permits a flow opening from the inner chamber to the atmosphere, to achieve a desired pressure release, above temperatures of approximately 200° C.

The energy absorbing device may be characterized by the fact that at least one of the confined components consists of plastic.

The energy absorbing device may also be characterized by the fact that a piston 14 is provided as a confining component.

The energy absorbing device may be further characterized by the fact that a separation piston 10 is provided as a confining component.

Additionally, the energy absorbing device can be characterized by the fact that the filling device 6 or 11 is designed as one of the confining component parts and may include a closing ball 6 or 11.

The energy absorbing device may have a seal or gasket between the telescoping tubes and may be characterized by the fact that the seal or gasket 9 has been developed into a fusible element.

As discussed hereinabove, the various fusible elements or components may be made of the same or different preferred plastic material or mixtures or composites of such plastic material as more specifically included in the Table provided hereinabove. Still further, at least one of the plastic materials may include, for example, heat resistant cast epoxies, FEP fluorocarbons, glass-filled melamines, glass-filled nylon, molded phenolics, CFE fluorocarbons, and/or high strength alkyds. Clearly, other such material having the above-mentioned characteristics could alternatively be employed to provide the invention.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. An impact damper for a motor vehicle having outer tubular means and inner tubular means, said inner tubular means being disposed within a portion of said outer tubular means, said impact damper having means for attachment to a portion of the body of a motor vehicle;
   said impact damper having means for attachment to a portion of the motor vehicle being impacted upon during a collision;
   means for interacting with a relative movement of said inner tubular means for transferring forces produced during impact with at least one of said outer tubular means and said inner tubular means;
   fluid means disposed for transferring at least a portion of forces upon the tubular means, for absorbing forces of impact to said fluid means during impact for slowing down the motor vehicle during a collision;
   means for confining sad fluid means within said impact damper;
   at least one of said inner tubular means and said outer tubular means having an interface portion for interfacing with said fluid means;
   means for retaining said inner tubular means in a predetermined position relative to said fluid means and said at least one outer tubular means at times when said forces of impact are not present;
   said means for retaining also being for retaining a position of said inner tubular means with respect to said outer tubular means, said retaining means being disposed such that said inner tubular means is movable with respect to said outer tubular means; and
   said confining means having means for opening a flow route for the fluid means to flow out of the impact damper, said means for opening the flow route being activatable at temperatures at least as great as 200° C.

2. The impact damper according to claim 1, wherein said means for opening said flow route for said fluid means includes a filling valve, said filling valve is for providing aid fluid to said impact damper, said filling valve includes a check ball element, said check ball element is formed of at least one plastic material, and said at least one plastic material is for melting at said temperature at least as great as about 200° C. for activating said means for opening said flow route.

3. The impact damper according to claim 1, wherein said means for confining said fluid includes a piston, said means for opening said flow route for said fluid means includes at least said piston, said piston is formed of a least one plastic material, and said at least one plastic material is for melting at said temperature at lease as great as about 200° C. for activating said means for opening said flow route through said piston.

4. The impact damper according to claim 1, wherein said means for opening said flow route for said fluid means includes ring means, said ring means is disposed about said inner tubular means, said ring means is disposed between said inner tubular means and said outer tubular means, said means for opening said flow route for said fluid means includes said ring means, said ring means is formed of at least one plastic material, and said at least one plastic material is for melting at said temperature at least as great as about 200° C. for activating said means for opening said flow route between said inner tubular means and said outer tubular means.

5. The impact damper according to claim 4, wherein said ring means includes at least one O-ring seal.

6. The impact damper according to claim 5, wherein said ring means further includes a retainer ring for establishing said predetermined position of said inner tubular means relative to said outer tubular means.

7. The impact damper according to claim 4, further including a retainer ring for establishing said predetermined position of said inner tubular means relative to said outer tubular means, wherein said retainer ring has at least one hole therethrough, and said means for opening said flow route between said inner tubular means and said outer tubular means includes said at least one hole through said retainer ring.

8. The impact damper according to claim 1, wherein said fluid means includes at least a gas, said means for confining said at least said gas includes at least a first portion of said inner tubular means and a filling valve, said filling valve is disposed in said first portion of said inner tubular means, said filling valve is for providing said at least said gas to said impact damper, and said means for opening said flow route for said at least said gas includes said filling valve.

9. The impact damper according to claim 8, wherein said filling valve includes a ball check valve, said ball check valve has a ball element, said ball element is formed of at least one plastic material, and said at least one plastic material is for melting at said temperature at least as great as about 200° C. for activating said means for opening said flow route for said at least said gas including said filling valve.

10. The impact damper according to claim 9, wherein said fluid means further includes a liquid, said means for confining said at least said gas includes a piston, said piston is mounted for movement within said inner tubular means, said piston has a first side and a second side, said first side of said piston is disposed toward said at least said gas, said means for confining said at least said gas includes said first side of said piston, said second side of said piston is disposed toward said liquid, said means for confining said liquid includes at least a second portion of said inner tubular means and aid second side of said piston, and said means for opening a flow route for said liquid includes said filling valve and further includes said piston.

11. The impact damper according to claim 10, wherein said piston is formed of at least a plastic material and said at least a plastic material is for melting at said temperature at least as great as about 200° C. for activating said means for opening said flow route through said piston.

12. The impact damper according to claim 1, wherein said fluid means is liquid, said means for confining said liquid includes at least a piston and a portion of said outer tubular means, and said means for opening includes said piston.

13. The impact damper according to claim 12, wherein said piston is formed of at least one plastic material and said at least one plastic material is for melting at said temperature at least as great as about 200° C. for activating said means for opening said flow route through said piston.

14. The impact damper according to claim 13, wherein said means for opening said flow route for said liquid further includes a hole in said outer tubular means and said hole in said outer tubular means is aligned with said piston when said inner tubular means is in said predetermined position relative to said outer tubular means.

15. The impact damper according to claim 14, further including a tubular element surrounding said inner tubular means, wherein said tubular element is disposed between said inner tubular means and said outer tubular means, said tubular element includes slot means, and said slot means is aligned with said hole during movement of said inner tubular means with respect to said outer tubular means.

16. The impact damper according to claim 9, wherein said fluid means further includes a liquid,
    said means for confining said at least said gas includes a first piston,
    said first piston is mounted for movement within said inner tubular means,
    said first piston has a first side and a second side, said first side of said first piston is disposed toward said at least said gas,
    said means for confining said at least said gas includes said first side of said first piston,
    said second side of said first piston is disposed toward said liquid,
    said means for confining said liquid includes at least a second portion of said inner tubular means and said second side of said first piston,
    a first one of said means for opening a flow route for said liquid includes said filling valve and further includes said first piston,
    said first piston is formed of at least a predetermined plastic material,
    said at least a said predetermined plastic material is for melting at said temperature at least as great as about 200° C. for activating said first one of said means for opening said flow route of said liquid through said piston,
    said means for confining said liquid further includes at least a second piston and a portion of said outer tubular means, a second of said means for opening a flow route for said liquid includes said second piston,
    said second piston is formed of at least one plastic material and said at least another predetermined plastic material,
    said at least said another predetermined plastic material is for melting at said temperature at least as great as 200° C. for activating said second means for opening said flow route through said second piston,
    said second of said means for opening said flow route for said liquid further includes a hole in said outer tubular means,
    said hole in said outer tubular means is aligned with said second piston when said inner tubular means is in said predetermined position relative to said outer tubular means,
    further including a tubular element surrounding said inner tubular means, means and said outer tubular means,
    said tubular element is disposed between said inner tubular means and said outer tubular means,
    said tubular element includes slot means, and
    said slot means is aligned with said hole during movement of said inner tubular means with respect to said outer tubular means.

17. An impact damper for a motor vehicle having outer tubular means and inner tubular means, said inner tubular means being disposed within a portion of said outer tubular means, said impact damper having means for attachment to a portion of the body of a motor vehicle;
    said impact damper having means for attachment to a portion of the motor vehicle being impacted upon during a collision;
    means for interacting with a relative movement of said inner tubular means for transferring forces produced during impact with at least one of said outer tubular means and said inner tubular means;
    fluid means disposed for transferring at least a portion of forces upon the tubular means, for absorbing forces of impact to said fluid means during impact for slowing down the motor vehicle during a collision;
    means for confining said fluid means within said impact damper;
    at least one of said inner tubular means and said outer tubular means having an interface portion for interfacing with said fluid means;
    means for retaining said inner tubular means in a predetermined position relative to said fluid means and said at least one outer tubular means at times when said forces of impact are not present;
    said means for retaining also being for retaining a position of said inner tubular means with respect to said outer tubular means, said retaining means being disposed such that said inner tubular means is movable with respect to said outer tubular means; and
    said confining means having means for opening a flow route for the fluid means to flow out of the impact damper, said means for opening the flow route being activatable at temperatures at least as great as about 175° C.

* * * * *

UNITED STATES PATENT AND TRADEMARK OFFICE
CERTIFICATE OF CORRECTION

PATENT NO. : 4,988,081

DATED : January 29, 1991

INVENTOR(S) : Wolfgang Dohrmann

It is certified that error appears in the above-identified patent and that said Letters Patent is hereby corrected as shown below:

In column 1, line 23, after 'a', delete "ga" and insert --gas--.

In column 1, line 64, after 'which', delete "ar" and insert --are--.

In column 6, line 27, after ' "shrunk on" ', delete "ring, which is exposed to the atmosphere, being equipped with a bore 7. With such an alternative embodiment being selectively employed, it should be clear that the "shrunk on" ".

In column 6, line 30, after '20', insert --,--.

In column 6, line 34, after 'ring,', insert --which is exposed to the atmosphere, being equipped with a bore 7. With such an alternative embodiment being selectively employed, it should be clear that the "shrunk on" ring 20--.

UNITED STATES PATENT AND TRADEMARK OFFICE
CERTIFICATE OF CORRECTION

PATENT NO. : 4,988,081

DATED : January 29, 1991

INVENTOR(S) : Wolfgang Dohrmann

It is certified that error appears in the above-identified patent and that said Letters Patent is hereby corrected as shown below:

In column 7, line 58 (claim 1, line 19), after 'confining', delete "said" and insert --said--.

In column 8, line 22 (claim 3, line 4), after 'of', delete "a" and insert --at--.

In column 8, line 24 (claim 3, line 6), after the second instance of 'at', delete "lease" and insert --least--.

in column 9, line 13 (claim 10, line 11), after "and', delete "aid" and insert --said--.

In column 10, line 24 (claim 16, line 48), after the first instance of 'means,' delete "means and said outer tubular means,"--.

Signed and Sealed this

Twenty-fifth Day of August, 1992

*Attest:*

DOUGLAS B. COMER

*Attesting Officer*      *Acting Commissioner of Patents and Trademarks*